US011553571B2

(12) United States Patent
Graff et al.

(10) Patent No.: US 11,553,571 B2
(45) Date of Patent: Jan. 10, 2023

(54) LUMINAIRE AS AN INTRINSICALLY SAFE POWER SOURCE

(71) Applicant: APPLETON GRP LLC, Rosemont, IL (US)

(72) Inventors: Timothy E. Graff, Arlington Heights, IL (US); Ravindra Viraj Gurjar, Pune (IN); Yicheng Peter Pan, Leander, TX (US)

(73) Assignee: APPLETON GRP LLC, Rosemont, IL (US)

( * ) Notice: Subject to any disclaimer, the term of this patent is extended or adjusted under 35 U.S.C. 154(b) by 221 days.

(21) Appl. No.: 16/793,121

(22) Filed: Feb. 18, 2020

(65) Prior Publication Data

US 2021/0235559 A1 Jul. 29, 2021

(30) Foreign Application Priority Data

Jan. 24, 2020 (IN) .............................. 202021003289

(51) Int. Cl.
  *H05B 45/3725* (2020.01)
  *H02J 9/06* (2006.01)
  (Continued)

(52) U.S. Cl.
  CPC ........ *H05B 45/3725* (2020.01); *H02J 7/0013* (2013.01); *H02J 7/0047* (2013.01); *H02J 9/061* (2013.01); *H04L 12/1895* (2013.01)

(58) Field of Classification Search
  CPC .... H05B 45/3725; H05B 45/37; H05B 47/19; H02J 7/0013; H02J 7/0047; H02J 9/061; H04L 12/1895
  See application file for complete search history.

(56) References Cited

U.S. PATENT DOCUMENTS 8,757,847 B2 6/2014 Seff et al.
9,955,549 B2 4/2018 Zhang et al.
(Continued)

OTHER PUBLICATIONS

"Quick Select Product Guide Process Interfaces", Pepperl+Fuchs Inc., 100 pages, (2018).
(Continued)

*Primary Examiner* — Toan T Vu
(74) *Attorney, Agent, or Firm* — Marshall, Gerstein & Borun LLP

(57) ABSTRACT

An intrinsically safe (IS) luminaire disposed in a hazardous environment provides visible light and serves as a primary, auxiliary, back-up, and/or charging source of IS DC power for external devices disposed in the hazardous environment, such as process control devices and equipment. The luminaire includes a power converter that converts received power into DC power, an IS barrier that converts the DC power into IS DC power native to or utilized by a recipient external device, and a power distribution port via which IS DC power is delivered to the external device. In some configurations, the luminaire monitors communicates statuses, alerts, and/or other information corresponding to delivering IS DC power to one or more external devices to a host and/or portable communication device. The luminaire may include multiple IS barriers of same and/or different IS ratings, and may dynamically control activation/deactivation of the IS barriers and/or usages thereof.

31 Claims, 6 Drawing Sheets

(51) Int. Cl.
 *H02J 7/00* (2006.01)
 *H04L 12/18* (2006.01)

(56) References Cited

U.S. PATENT DOCUMENTS

| | | |
|---|---|---|
| 9,970,639 B2 | 5/2018 | Yadav et al. |
| 10,064,248 B2 | 8/2018 | Janik et al. |
| 10,117,300 B2 | 10/2018 | Doheny et al. |
| 10,190,759 B2 | 1/2019 | Yadav et al. |
| 2001/0028305 A1 | 10/2001 | Bennett et al. |
| 2014/0300274 A1* | 10/2014 | Acatrinei ............... H05B 45/50 315/122 |
| 2016/0356474 A1 | 12/2016 | Jayawardena |
| 2017/0156189 A1* | 6/2017 | Jayawardena .......... H02J 9/061 |
| 2017/0184659 A1 | 6/2017 | Jayawardena et al. |
| 2019/0301689 A1* | 10/2019 | Hetrick ................... F21S 2/005 |

OTHER PUBLICATIONS

First Examination Report for India Application No. 202021003289, dated Sep. 10, 2021.
International Search Report and Written Opinion for Application No. PCT/US2020/046595, dated Oct. 14, 2020.
International Preliminary Report on Patentability for application No. PCT/US2020/046595, dated Aug. 4, 2022.

* cited by examiner

LUMINAIRE AS AN INTRINSICALLY SAFE POWER SOURCE

CROSS REFERENCE TO RELATED APPLICATIONS

This application claims priority to Indian Patent Application No. 202021003289, which was filed on Jan. 24, 2020 and is entitled "Luminaire as an Intrinsically Safe Power Source," the entire contents of which are hereby incorporated by reference.

FIELD OF THE DISCLOSURE

This disclosure relates to luminaires, lighting units, and light fixtures that are disposed in hazardous environments, such as intrinsically safe and/or explosion proof luminaires, lighting units, and light fixtures that provide ambient, task, and/or focused light within hazardous environments.

BACKGROUND

The background description provided within this document is for the purpose of generally presenting the context of the disclosure. Work of the presently named inventors, to the extent described in this background section, as well as aspects of the description that may not otherwise qualify as prior art at the time of filing, are neither expressly nor impliedly admitted as prior art against the present disclosure.

Intrinsically safe, explosion proof, or other hazardous rated luminaires, lighting units, and light fixtures provide general, ambient light and/or task or focused light within hazardous environments such as industrial process plants, manufacturing facilities, oil refineries, power-generating systems, mines, and the like. As such, intrinsically safe and/or explosion proof luminaires, lighting units, and light fixtures must comply with all standards and/or regulatory rules that are applicable to the particular hazardous environment in which they are disposed, e.g., to prevent ignition and/or explosion of hazardous atmospheric mixtures such as flammable gases and/or dust, to protect electronics within the luminaire from being compromised or damaged, to contain any explosion that may occur, etc. Such luminaires may be rated by Class, Division, and Group. For example, Class I Division 1, or Class I Division 2 Group D, E, and F are commonly required ratings for products that are located in hazardous environments within the petrochemical industry, in which flammable vapors may be present. Generally speaking, intrinsically safe, explosion proof, or other hazardous rated luminaires and light fixtures are designed to limit undesirable and/or dangerous effects of thermal and/or electrical energy generated during both their normal use and maintenance, as well as during fault conditions. For ease of reading, intrinsically safe, explosion proof, or other hazardous rated luminaires, lighting units, and/or light fixtures that are located in hazardous environments are generically referred to herein as "hazardous environment (HE) luminaires, lighting units, and/or light fixtures", and/or simply as "luminaires, lighting units, and/or light fixtures."

Similar to HE luminaires, other types of electronic equipment disposed in hazardous environments also utilize intrinsically safe (IS) configurations and implementations to mitigate risk (e.g., of ignition, fire, explosion, etc.), and must comply with all standards and/or regulatory rules that are applicable to the particular hazardous environment in which they are disposed. For example, within industrial power plants, process control devices such as controllers, field devices (e.g., sensors, valves, actuators, etc.), and other electronic devices are configured and installed using IS techniques and equipment. For instance, to provide power to electronic devices disposed in the hazardous environment, an AC power panel or other type of AC power source may be installed in a non-hazardous environment. The AC power generated by the AC power source is converted into DC power, which traverses through an IS barrier prior to being delivered into the hazardous environment. Alternatively, a non-IS DC power source may be installed in the non-hazardous environment, and the power generated by the non-IS DC power source may traverse through the IS barrier prior to being delivered into the hazardous environment. Within the hazardous environment, IS DC power produced via the IS barrier is delivered to various electronic devices via respective IS wiring and cabling runs, thereby providing IS DC power to electronic devices disposed in the hazardous environment.

Accordingly, to provide IS DC power to electronic devices that are disposed in hazardous environments, IS wiring and cabling must be individually run from the IS barrier to each HE electronic device. Consequently, intrinsic safety barrier implementation and power delivery is very expensive, e.g., in materials and products, time, and costs needed to install and maintain the IS cabling runs to each individual HE electronic device. Further, IS cabling runs may result in electronic devices being mounted or installed in less than ideal locations for industrial process purposes merely to accommodate the physical requirements and limitations of the IS cabling mechanisms, thus adding to the costs and complexity of installing and maintaining electronic devices within the hazardous environment.

SUMMARY

The systems, methods, and techniques disclosed herein relate to a hazardous environment (HE) luminaire, lighting unit, or light fixture disposed in a hazardous environment. The terms "luminaire," "lighting unit", and "light fixture" are utilized interchangeably herein to refer to an electrically powered group of components that operates to supply general or ambient light and/or task or focused light in the portion of the electromagnetic spectrum that is visible to the human eye, e.g., from about 380 to 740 nanometers. During normal run-time operations, embodiments of the disclosed HE luminaire radiates general or ambient light and/or task or focused light into the hazardous environment. Advantageously, the disclosed HE luminaire is configured to leverage the AC power that it receives to provide IS DC power to nearby or proximate electronic devices that are installed in hazardous environments. That is, the disclosed HE luminaire may serve as an IS DC power hub for intrinsically safe electronic devices, e.g., that are disposed in a hazardous environment, and thus may replace individual IS DC power cabling runs from AC or DC power panels/sources disposed in a non-hazardous environment to each device disposed in the hazardous environment. As such, for ease of reading, embodiments of the disclosed luminaire are referred to herein as Intrinsically Safe Power Source Luminaires or "IS-PSLs." Moreover, as IS-PSLs are installed throughout hazardous environments to provide ambient and/or task lighting, IS-PSLs may be leveraged to easily provide IS DC power at various locations throughout the hazardous environment. Accordingly, by utilizing IS-PSLs to deliver IS DC power to hazardous environment electronic devices, the costs and resources that are typically needed to install, run, and maintain individual IS cabling runs to the electronic devices are greatly reduced, and in some cases, eliminated. Further, utilizing IS-PSLs as IS DC power sources in a hazardous environment increases the flexibility and scalability of electronic devices and equipment within the hazardous environment, as individual DC power cabling runs no longer affect the physical layout and placements of the electronic devices and equipment.

In an embodiment, an intrinsically safe power source luminaire, lighting unit, or light fixture is disposed in a hazardous environment and includes a power-reception port via which power is received, and one or more drivers coupled to one or more illumination sources, where the one or more drivers are powered by at least a first portion of the received power to operate the one or more illumination sources. The IS-PSL further includes a power converter that converts at least a second portion of the power received via the power-receiving port into DC power of one or more DC voltages utilized by one or more external IS devices disposed in the hazardous environment (and/or passes through at least a second portion of the received power, e.g., when the received power is DC power of a DC voltage utilized by the one or more external IS devices). Still further, the IS-PSL includes an intrinsically-safe (IS) barrier that is converts the DC power generated, produced, or passed through by the power converter into IS DC power, and one or more power-distribution ports via which the IS DC power is delivered to power the one or more external IS devices. The IS-PSL also includes a hazardous location enclosure in which the one or more drivers, the one or more illumination sources, the power converter, the IS barrier, and optionally other components are disposed.

In an embodiment, a method at an intrinsically safe power source luminaire disposed in a hazardous environment includes receiving power via a power-reception port of the luminaire, and powering one or more drivers to operate one or more illumination sources using at least a first portion of the received power. The method further includes converting, via a power converter of the luminaire, at least a second portion of the received power into DC power of one or more DC voltages utilized by one or more external devices disposed in the hazardous environment, or passing through at least a second portion of the received power (e.g., when the received power is DC power of a DC voltage utilized by the one or more external IS device(s) to an intrinsically-safe (IS) barrier included in the luminaire. Additionally, the method includes converting, via the IS barrier of the luminaire, the DC power generated, produced, or passed through by the IS barrier into intrinsically-safe (IS) DC power; and delivering, via one or more power distribution ports of the luminaire, the IS DC power to the one or more external IS devices disposed in the hazardous environment. The IS-PSL includes a hazardous location enclosure in which the one or more drivers, the one or more illumination sources, the power converter, the IS barrier, and optionally other components are disposed.

DETAILED DESCRIPTION

Figure 1:
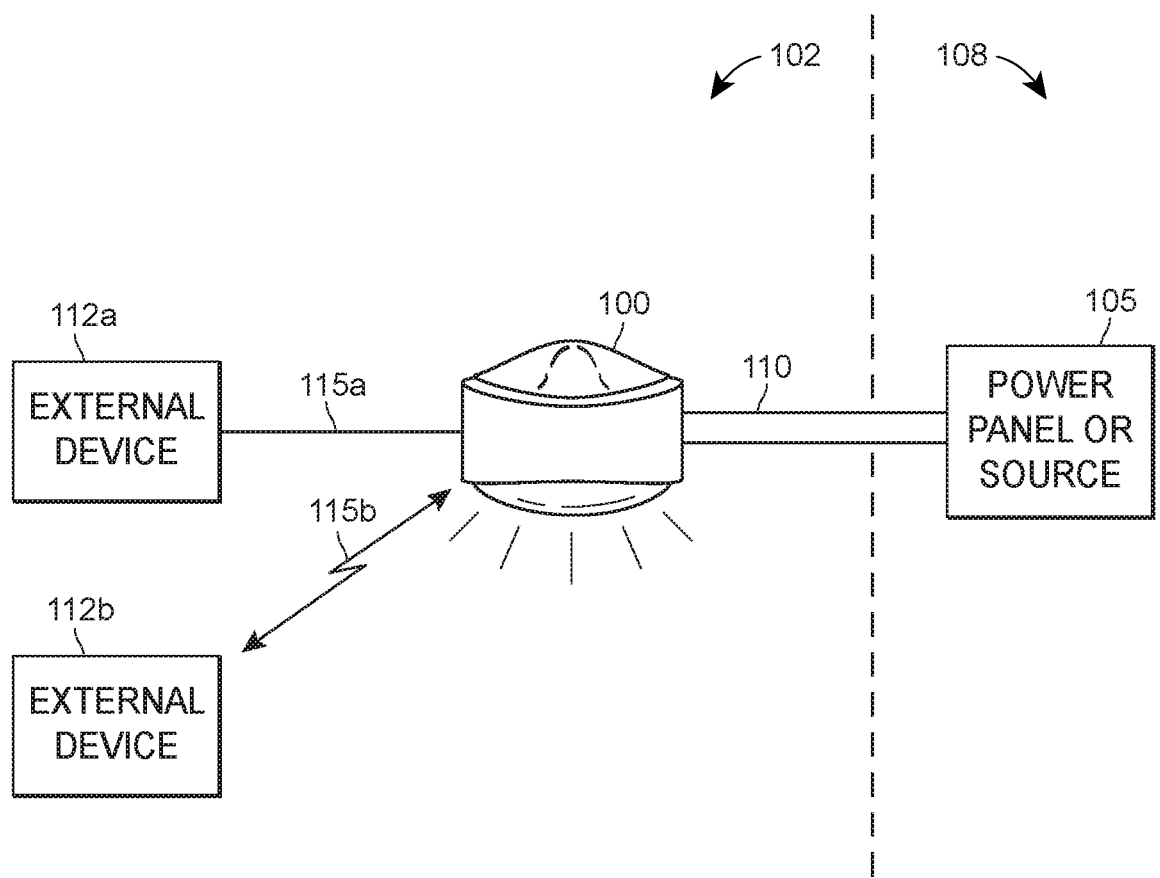
FIG. 1 is a block diagram of an example hazardous environment lighting unit, light fixture, or luminaire that provides visible light and is a source of intrinsically safe DC power for other devices disposed in the hazardous environment, e.g., an intrinsically safe power source luminaire.

FIG. 1 depicts an example hazardous environment lighting unit (also referred to interchangeably herein as a "light," "lighting unit," "light fixture," or "luminaire") 100 that is disposed in a hazardous environment 102, such as an industrial process plant, a manufacturing facility, an oil refinery, a power-generating system, a mine, etc. As such, the luminaire 100 is a hazardous environment (HE) or Intrinsically Safe (IS) luminaire that is compliant with any (and in some cases, all) standards and/or regulations governing its configuration, installation, and usage within the hazardous environment. That is, the IS luminaire 100 complies with standard and/or regulated thermal and electrical limits so as to limit the energy generated by the luminaire 100 that is available for potential ignition and/or explosion within the hazardous environment. As illustrated in FIG. 1, the IS luminaire 100 receives power from a power panel or source 105 that is disposed in a non-hazardous environment 108. The power panel 105 delivers AC or non-IS DC power to the IS luminaire 100 in an intrinsically safe manner which is typically physical in nature, e.g., via wires, cabling, or other suitable power transmission media 110 that are enclosed within conduit that is run through ceilings, walls, etc. within the hazardous environment 102. The power may be of any standard or suitable AC voltage typically ranging between 100V AC to 480 V AC (such as 110 V, 115V, 220 V, 230 V, 240V, 440V AC etc.), or the power may be of any standard or suitable DC voltage typically ranging between 24V DC and 300V DC, (e.g., low voltage DC such as 24V DC, or high voltage DC such as 300 V DC) which is not intrinsically safe, e.g., "non-IS DC voltage," as generally referred to herein.

It is noted that various portions of the present document describe the IS luminaire 100 (and/or embodiments thereof) as receiving AC power from an AC power panel or source, however, this is only for ease of discussion purposes, and is non-limiting. Indeed, any one or more of the techniques described herein may easily be applied to an IS luminaire 100 (and/or embodiments thereof) that receives non-IS DC power from a non-IS DC power source. As utilized herein a "non-IS" DC power source generally refers to a DC power source that generates DC power without regard to any IS standards and/or regulations. That is, the DC power generated by the non-IS DC power source may or may not meet any IS standard and/or regulation pertaining to hazardous environments, and the non-IS DC power source is not designed and/or configured to meet any IS standard and/or regulation pertaining to hazardous environments.

Advantageously, the IS luminaire 100 is further configured to serve as an Intrinsically Safe (IS) DC power source or hub for one or more external devices 112a, 112b that are also disposed in the hazardous environment 102. Accordingly, for ease of discussion herein, the IS luminaire 100 that provides both visual light and IS DC power in hazardous environments 102 is referred to as an "IS power source luminaire" or "IS-PSL." As shown in FIG. 1, the IS-PSL 100 delivers IS DC power to external device 112a via a wired power delivery mechanism 115a (e.g., via a wire, cable, or another type of physical link), and delivers IS DC power to external device 112b via a wireless power delivery mechanism 115b (e.g., using a near field wireless power technique, power beaming, or other suitable wireless power transfer technique). External devices 112a, 112b may be any type of electronic device that is utilized in the hazardous environment and that is powered by DC, such as process controllers, field devices or equipment (e.g., sensors, monitors, valves, actuators, pumps, etc.), safety controllers and/or logic solvers, drivers (such as solenoid drivers and other types of drivers), I/O devices, etc. Generally, the external devices 112a, 112b are intrinsically safe external devices and have an IS rating suitable for the hazardous environment 102 in which they are disposed. The external devices 112a, 112b may include an electronic device which is mounted or installed within the hazardous environment 102, and/or may include a mobile or portable communication device that is located in the hazardous environment 102, for example. At least some of the external devices 112a, 112b may include one or more on-board batteries, which may serve as primary, auxiliary, emergency, and/or back-up sources of DC power for the host external device 112a, 112b.

Figure 2A:
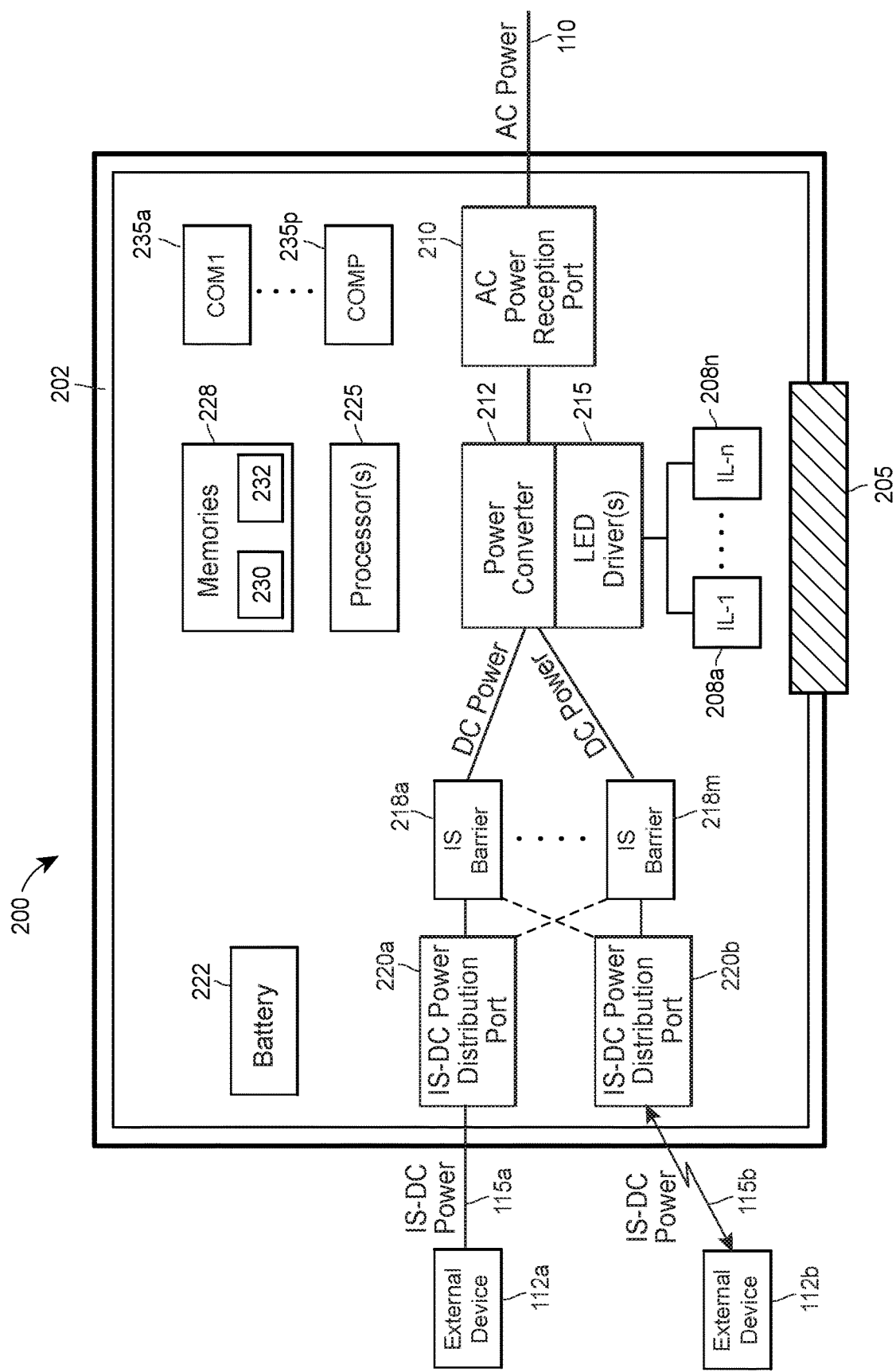
FIG. 2A is a block diagram of an embodiment of the intrinsically safe power source luminaire of FIG. 1.

FIG. 2A depicts a block diagram of an embodiment 200 of the example IS power source luminaire of IS-PSL 100. The IS-PSL 200 receives AC power 110 from an AC power panel (not shown in FIG. 2A), and delivers IS DC power via wired power transfer media 115a to external device 112a and/or delivers IS DC power via wireless power transfer media 115b to external device 112b. The IS-PSL 200 includes at least one hazardous location enclosure or housing 202 in which at least some of its components are typically disposed or enclosed. For example, the hazardous location enclosure or housing 202 may be explosion-proof, flame-proof or otherwise at least partially non-incendive, water-proof, sealed, hermetically sealed, dust ignition protected, etc. In some embodiments of the IS-PSL 200 (not shown in FIG. 2A), a single IS power source luminaire 200 may include multiple hazardous location enclosures or housings 202, each of which surrounds a different subset of components of the luminaire 200; however, for ease of reading, and not for limitation purposes, the hazardous location enclosure or housing 202 is referred to herein using the singular tense. Moreover, at least one portion 205 of the hazardous location enclosure or housing 202 is at least partly transparent or visible light-permeable, so that illumination or light generated by one or more illumination sources IL-1 to IL-n (corresponding to references 208a-208n in FIG. 2A) of the IS-PSL 200 is able to radiate into the environment. The illumination sources 208a-208n may be any suitable type of illumination source that generates visible light, e.g., incandescent, halogen, fluorescent, metal halide, xenon, LEDs (light emitting diodes), etc.

The IS-PSL 200 also includes a power-reception port 210 via which the AC power 110 is received. The AC power-reception port 210 is coupled to a power converter 212 that converts the received AC power into DC power which, as shown in the embodiment 200 of FIG. 2A, may be used to power one or more LED drivers 215 to activate/deactivate and/or otherwise operate the illumination sources 208a-208n. In an embodiment, the AC-to-DC power converter 212 and the LED driver(s) 215 are an integral or unitary component of the IS-PSL 200, and in other embodiments, the power converter 212 and the LED driver(s) 215 are separate components of the IS-PSL 200. In some embodiments, the IS-PSL 200 includes a single power converter 212, which may generate or produce different voltages of DC power at different instances in time from the received AC power 110. In some embodiments (not shown), the IS-PSL 200 includes multiple power converters, each of which converts the received AC power into a different voltage of DC power. In still other embodiments (not shown), the LED driver(s) 215 may be AC-powered LED drivers, and as such may be directly coupled to the power-reception port 210 to receive AC power 110 for activating and deactivating the illumination sources 208a-208n, while a separate AC-to-DC power converter 212 converts the received AC power 110 into DC power for powering external devices 112a, 112b. The AC-to-DC power converter 212 may produce and provide DC power (e.g., non-IS DC power) to one or more IS barriers 218a-218m that are disposed within the hazardous location enclosure 202 of the IS-PSL 200, e.g., simultaneously or in parallel, sequentially, selectively, etc.

It is noted that in embodiments of the IS-PSL 200 in which the IS-PSL 200 receives non-IS DC power via its power-reception port 210 (not shown), the AC-to-DC power converter 212 may be omitted, and at least a portion of the received non-IS DC power may be directly provided to the one or more IS barriers 218a-218m. Alternatively, in these embodiments in which the received power is non-IS DC power, the power converter 212 may be implemented as a DC-to-DC power converter, splitter, divider, etc. that converts or transforms the received non-IS DC power into non-IS DC power of one or more DC voltages that are utilized by the recipient external devices 112a, 112b, and provides the transformed or converted non-IS DC power to the one or more IS barriers 218a-218m. Still alternatively, in these embodiments, the power converter 212 may be implemented as a pass-through component that provides the received non-IS DC power to the one or more IS barriers 218a-218m without modifying the DC voltage of the received non-IS DC power, e.g., when the recipient external devices 112a, 112b are able to utilize the DC voltage of the received non-IS DC power.

Each IS barrier 218a-218m may correspond to a different intrinsically-safe rating, e.g., for different voltages, zone usages, classes, divisions, groups, etc., and as such each IS barrier complies with corresponding IS requirements and standards. Although in FIG. 2A each different IS barrier 218a-218m is depicted as an individual unit, in some embodiments, a single, integral IS barrier unit may provide IS protection for multiple different IS ratings, e.g., either in parallel or by switching between provided IS ratings. For ease of discussion, though, the IS barriers 218a-218m are described herein as individual units, each with a respective IS rating, some of which may be the same IS rating, and some of which may be different IS ratings. For example, the IS barriers 218a-218m may include one or more respective IS barriers, each of which respectively may produce IS DC power of 2 Volts DC, 5.6 VDC, 12 VDC, 24 VDC, 30 VDC, 300 VDC, or any other desired output DC voltage that is able to be generated (e.g., via power converter 212) from the level of received AC power 110 received at the IS-PSL 200 via the AC power-reception port 210. Generally, the IS-PSL 200 includes at least one IS barrier 218a-218m that respectively produces IS DC power in accordance with a DC voltage that is native to or utilized by each external device 112a, 112b that the IS-PSL 200 services. For example, the IS-PSL 200 may generate and deliver IS DC power at 5.6 VDC to an external device that natively utilizes 5.6 V IS DC power, such as a battery-powered external device, and/or the IS-PSL 200 may generate and deliver IS DC power at 12

VDC to an external device that natively utilizes 12 V IS DC power, such as a field device (e.g., a sensor, valve, actuator, etc.). In some embodiments, at least two IS barriers 218a-218m included in the IS-PSL 200 may have a same or common IS rating. In some embodiments, at least two IS barriers 218a-218m included in the IS-PSL 200 may have different IS ratings. At any rate, each IS barrier 218 transforms the DC power received from the AC-to-DC power converter 212 into IS DC power in accordance with its respective IS rating. The connectivity relationships between the AC-to-DC power converter(s) 212 and the IS barrier(s) 218 of the IS-PSL 200 may be one-to-one, one-to-many, or many-to-many, for example.

Additionally, each IS barrier 218a-218m is connected to one or more IS DC power distribution ports 220a, 220b via which the IS DC power produced by each IS barrier 218a-218m may be delivered from the IS-PSL 200 to one or more external devices 112a, 112b. As shown in FIG. 2A, the IS DC power distribution port 220a delivers IS DC power via wired media 115a, and the IS DC power distribution port 220b delivers IS DC power via wireless media 115b. Further, although FIG. 2A depicts a one-to-one correspondence between power distribution ports 220a, 220b and external devices 112a, 112b, in some arrangements, a single IS DC power distribution port may distribute power to multiple external devices, e.g., via a splitter, divider, or some other suitable mechanism or arrangement. Generally, each of the one or more external devices 112a, 112b may receive IS DC power that is transferred from the IS-PSL 200 and that is at a DC voltage native to or utilized by each recipient device 112a, 112b. Each recipient device 112a, 112b may utilize the IS-PSL 200 as a main or primary IS DC power source for operational purposes, as an auxiliary, supplemental, emergency, and/or back-up power source, and/or to charge one or more batteries or energy storage devices which may be included in or otherwise service the device 112a, 112b.

In some embodiments, the AC-to-DC power converter 212 of the IS-PSL 200 provides converted DC power to charge one or more on-board batteries or energy storage devices 222 of the IS-PSL 200 itself. The batteries 222 may serve as a back-up, supplemental, and/or emergency power source for the IS-PSL 200, and as such may be utilized to power the one or more drivers 215, one or more on-board processors 225, and/or other components of the IS-PSL 200 as and when needed. In embodiments of the IS-PSL 200 in which the IS-PSL 200 receives non-IS DC power via its power-reception port 210 and the AC-to-DC power converter 212 is omitted (not shown), the IS-PSL 200 may charge its on-board batteries or energy storage devices 222 using at least a portion of the received non-IS DC power. For example, the IS-PSL 200 include one or more voltage splitters, dividers, and/or switches that provide the non-IS DC power received via the power-reception port 210 to multiple recipient components of the IS-PSL 200, such as on-board batteries 222, one or more drivers 215, one or more processors 225, and/or other components.

Indeed, the IS-PSL 200 optionally includes one or more processors 225 and one or more tangible, non-transitory memories 228 storing one or more sets of computer-executable instructions 230 and data 232 related to IS DC power. Generally speaking, the one or more processors 225 may execute the one or more sets of computer-executable instructions 230 and optionally utilize at least some of the data 232 to communicate information regarding the delivery of IS DC power from the IS-PSL 200 to one or more other external devices 112a, 112b, e.g., by transmitting signals to the one or more other devices via one or more communication ports 235a-235p of the IS-PSL 200 and one or more links and/or networks. The recipients of the informational IS-DC power signals may include, for example, a back-end server or host, a computing device disposed within the hazardous environment (which may be a wireless computing device), the external devices 112a, 112b, and/or other devices.

The IS-PSL 200 may be communicatively connected to a wireless network or wireless link via a first communication interface (COM1) 235a and/or may be communicatively connected to a wired network or wired link via a second communication interface (COMp) 235p. As such, the IS-PSL 200 may be a node of a wireless network and/or may be a node of a wired network. Each of the wireless and/or wired networks may include one or more other nodes such as, for example, one or more back-end computers, hosts, controllers, and/or servers that are disposed in a non-hazardous environment or that are otherwise shielded from the harsh conditions of the hazardous environment, and/or one or more mobile or portable communication devices that are operated by personnel within the hazardous environment. Other examples of nodes which may be included in the wireless and/or wired network may include one or more other luminaires, sensors, process control devices, and/or other devices disposed within the hazardous environment. As such, the IS-PSL 200 may execute, via the one or more processors 225, at least some of the computer-executable instructions 230 to communicate information or data related to IS DC power to and/or receive information or data related to IS DC power from one or more of the nodes to which the IS-PSL 200 is communicatively connected.

Examples of information which the IS-PSL 200 may communicate via the communication interfaces 235a-235p include status, alert, and/or configuration information related to IS DC power corresponding to the external devices 112a, 112b and/or to the IS-PSL 200 itself. For example, the IS-PSL 200 may monitor and/or track the respective DC power delivery to each of the external devices 112, and communicate related information related to a back-end server or mobile device. To illustrate, in an example arrangement, the IS-PSL 200 receives (e.g., from the back-end server or mobile device) and stores one or more IS DC power configurations for each external device 112a, 112b to which the IS-PSL 200 provides IS DC power for run-time or operational purposes, where the respective IS DC power configurations may indicate respective amounts and/or rates of IS DC power (and/or maximums, minimums, and/or ranges thereof) that are expected to be drawn by each device 112a, 112b. The IS-PSL 200 may transmit an alert to the back-end server and/or a portable communication device when a device 112a, 112b is drawing operational IS DC power at an amount and/or rate greater than its respective threshold(s). Additionally or alternatively, the IS-PSL 200 may transmit respective (e.g., non-alert) power usage amounts and/or statuses of the primary IS DC power drawn by each external device 112a, 112b (e.g., to the back-end server and/or a mobile communication device) periodically, over time, and/or on demand, e.g., for tracking purposes.

Further, in some arrangements, the IS-PSL 200 may monitor and/or track the DC power consumption of batteries that are utilized by the external devices 112a, 112b, e.g., batteries that are located on-board the external devices 112 and that serve as a primary operational power source, and/or batteries that serve as back-up or secondary power sources to the external devices 112a, 112b. For example, the IS-PSL 200 may provide IS 12V or 24V DC power to an external device 112a as a primary source of IS DC power (e.g., either directly and continuously, or for charging a 12 V or 24V DC primary power source battery on-board the device 112a), and the IS-PSL 200 may also provide IS 5.5V DC power to the external device 112a for charging a back-up or emergency battery of the device 112a. In some embodiments, the respective IS DC power configurations of serviced external devices 112 that are provided to the IS-PSL 200 include indications of the expected voltages and/or usages of batteries that are on-board or otherwise utilized by the serviced external devices 112, and/or indications of whether the batteries of the external devices 112 are primary or back-up power sources. Accordingly, in addition to monitoring the primary, operational IS 12V or 24V DC power that it provides to the external device 112a, the IS-PSL 200 may also monitor the amounts of IS 5.5 V DC power it provides to the external device 112a (and/or how often it provides IS 5.5 V DC power to the external device 112a), thereby effectively monitoring the battery power consumption and/or expected remaining battery supply or lifetime of the device's back-up battery. In arrangements in which the external device 112a is a smart device (e.g., when the device 112a includes an on-board processor and communication port via which the device 112a communicates with the IS-PSL 200), the smart external device 112a may self-monitor its expected back-up battery supply or remaining lifetime, and may report corresponding battery-related information to the IS-PSL 200. However, irrespective of whether the battery usage of the external device 112a is indirectly monitored by the IS-PSL 200 or is self-monitored by the external device 112a, the IS-PSL 200 may report the back-up battery usage (e.g., power consumption, expected remaining battery supply or lifetime, etc.) of the external device 112a to the back-end server and/or to a portable communication device, e.g., periodically, over time, and/or on demand. For example, the IS-PSL 200 may communicate an alert when the expected remaining battery lifetime of the back-up battery of the external device 112a falls below a pre-defined, respective threshold, when re-charging occurs at a rate faster than a respective, pre-defined threshold, etc. For an external device that utilizes a battery as a primary source of DC power (e.g., external device 112b), the IS-PSL 200 may monitor and report on the device's primary battery usage in a manner similar to that described above with respect to back-up batteries.

In some arrangements in which the external devices 112a, 112b are smart devices, the IS-PSL 200 may transmit instructions or commands to the external devices 112a, 112b to manage and/or modify the devices' primary and/or back-up battery power usage, e.g., sleep, wake-up, power down, etc. The IS-PSL 200 may automatically or autonomously generate device battery management instructions in response to monitored device battery power status (e.g., by utilizing the computer-executable instructions 230 and/or local data 232), and/or the IS-PSL 200 may forward instructions that it receives from the back-end server and/or a mobile device to the external devices 112a, 112b for device battery management purposes.

Generally speaking, the IS-PSL 200 may communicate with smart external devices 112a, 112b via the one or more communication ports 235a-235p and respective wired and/or wireless links, which typically (but not necessarily) are direct links between the IS-PSL 200 and the smart devices 112a, 112b. The communication links via which the IS-PSL 200 and the smart external devices 112a, 112b communicate may support standardized wired and/or wireless communication protocols, such as Ethernet, IP, Wi-Fi, other types of IEEE-based protocols, Bluetooth and/or other short range protocols, etc., and/or the communication links via which the IS-PSL 200 and the smart external devices 112a, 112b communicate may support industrial communication or automation protocols, such as 4-20 mA, Fieldbus, Profibus, OPC-UA, wired HART, WirelessHART, HART-IP, etc.

Another example of information which the IS-PSL 200 may communicate to back-end servers and/or mobile devices include alert, status, and/or configuration information related to IS DC power of the IS-PSL 200 itself. For example, the IS-PSL 200 may include an on-board back-up battery 222 that the IS-PSL 200 charges using DC power provided by the AC-to-DC power converter 212, and the IS-PSL 200 may monitor and communicate usage status and/or alerts related to the battery 222 to a back-end server and/or mobile device. Indeed, the IS-PSL 200 may monitor its internal DC power usage (e.g., power draw, loading, etc.) across one or more of its internal components (e.g., the battery 222, the IS barriers 218-218m, the power distribution ports 220a, 220b, etc.), and may provide statuses and/or alerts relating thereto to a back-end server and/or mobile device. In some arrangements, the IS-PSL 200 may automatically or autonomously modify its DC power usage and/or activate and deactivate various components in response to the monitoring. Additionally or alternatively, the IS-PSL 200 may modify its DC power usage in response to instruction(s) that the IS-PSL 200 receives (e.g., via the communication ports 235a-235p) from the back-end server or mobile device, where the received instructions may or may not have been transmitted by the back-end server or mobile device in response to a status, alert, or other communication which was previously generated and transmitted by the IS-PSL 200. Modifications to DC power usage of the IS-PSL 200 may include, for example, re-distributing IS-DC power loading among one or more of the IS barriers 218a-218m, the power distribution ports 220a, 220b, the communication ports 235a-235p, and/or other components; deactivating and/or deactivating (e.g., disabling/enabling, turning off/turning on) various IS barriers 218a-218m, the power distribution ports 220a, 220b, the communication ports 235a-235b, and/or other components; managing the usage of the on-board battery 222; etc.

In some embodiments, the IS-PSL 200 may receive, from the back-end server or operator mobile device, information regarding its own configuration. The configuration may include thresholds that are utilized by the IS-PSL 200 to manage its own power usage and consumption, such as described above. Additionally or alternatively, the configuration may indicate different voltage settings of different IS barriers 218a-218m, different voltages that are to be generated by the AC-to-DC power converter 212, different voltages that are to be generated by and/or utilized by other components of the IS-PSL 200, etc. In some instances, the configuration may indicate various times, triggers, and/or conditions that would cause changes in voltage settings; etc.

In some embodiments, the IS-PSL 200 is a smart or connected luminaire. In these embodiments, the memories 228 of the IS-PSL 200 store additional computer-executable instructions 230 that, when executed by the one or more processors 225, cause the IS-PSL 200 to instruct the one or more drivers 112 control lighting functions, for example, to energize or activate the one or more illumination sources 208a-208n, e.g., individually or independently, and/or as a set or group in a coordinated manner. Additionally, the execution of the additional computer-executable instructions 230 may cause the IS-PSL 200 to transmit and/or receive information regarding lighting statuses, alerts, diagnostics, control commands, and/or other lighting operations to/from a back-end server, a mobile device, and/or other smart luminaires, e.g., via one or more of the communication ports 235a-235p.

Figure 2B:
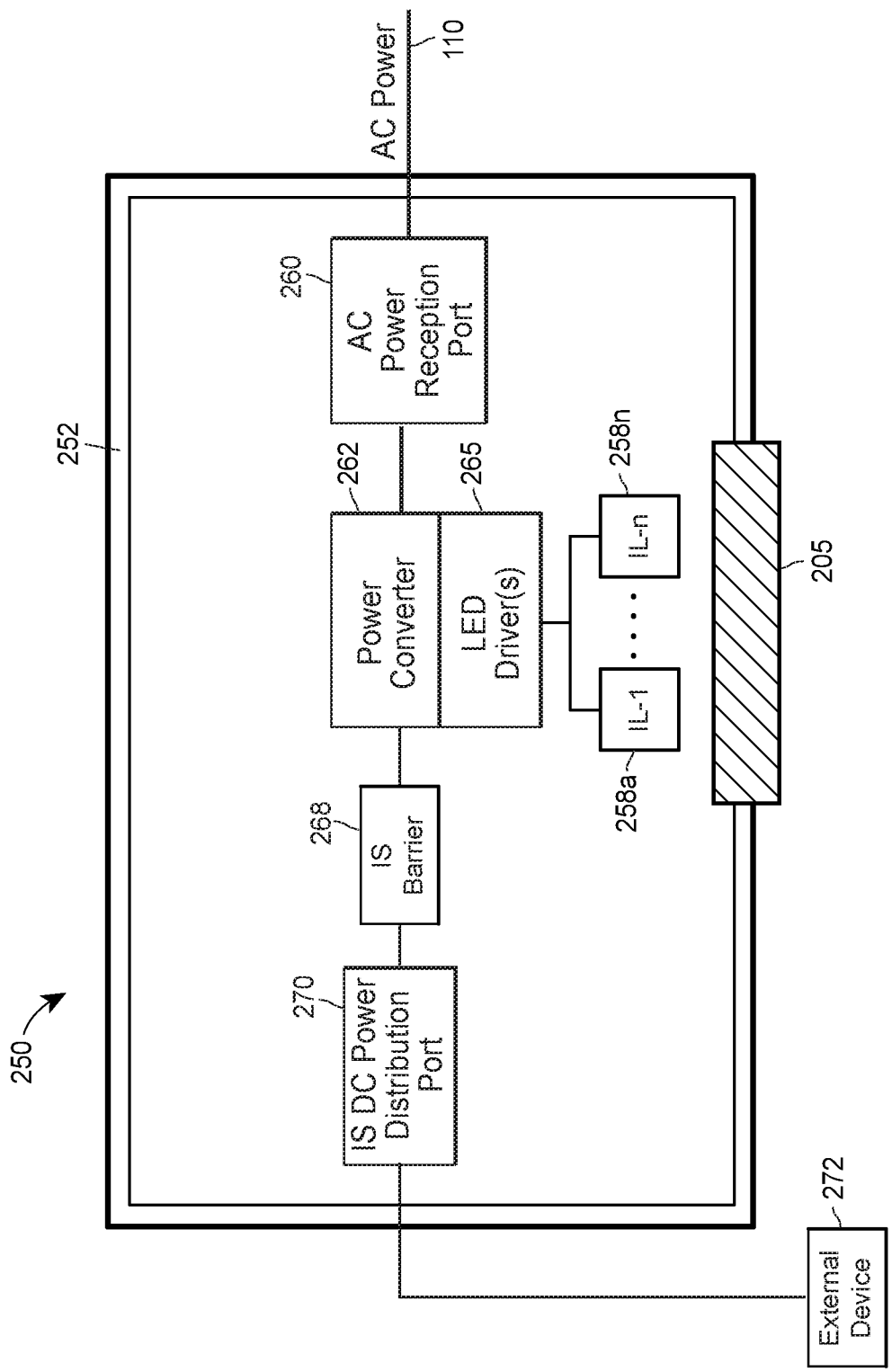
FIG. 2B is a block diagram of another embodiment of the intrinsically safe power source luminaire of FIG. 1.

It is noted that FIG. 2A depicts only one example embodiment 200 of a plurality of embodiments of the intrinsically safe power source luminaire 100 described herein. Other embodiments of the IS-PSL 100 may include fewer, additional, and/or alternate features than those described with respect to the embodiment 200. For example, FIG. 2B depicts an embodiment 250 of an IS-PSL 100. Similar to the embodiment 200 of FIG. 2A, the IS-PSL 250 includes a hazardous environment enclosure or housing 252 having an at least partly transparent or visible light-permeable portion 255 via which one or more illumination sources 258a-258n may radiate visible light into the hazardous environment. The IS-PSL 250 also includes an AC power-reception port 260 via which AC power 110 is received, an AC-to-DC power converter 262, and one or more LED drivers 265 that activate and deactivate the illumination sources 258a-258n. In the embodiment 250, though, the DC power produced by the power converter 262 is provided to a single, IS barrier 268, which in turn provides IS DC power via an IS DC power distribution port 270 to an external IS device 272. In this embodiment 250, the IS barrier 268 is of a fixed intrinsically safe rating, which may be pre-selected prior to integrating the IS barrier 268 into the luminaire 250, for example. As such, the embodiment 250 may be particularly useful to convert legacy luminaires into power source luminaires.

It is noted that in embodiments of the IS-PSL 250 in which the IS-PSL 250 receives non-IS DC power via its power-reception port 260 (not shown), the AC-to-DC power converter 262 may be omitted, and the received non-IS DC power may be directly provided to the single, IS barrier 268. Alternatively, in these embodiments in which the received power is non-IS DC power, the power converter 262 may be implemented as a DC-to-DC power converter, splitter, divider, etc. that converts or transforms the received non-IS DC power into non-IS DC power of the DC voltage that is utilized by the recipient external device 272 and provides the converted or transformed non-IS DC power to the one or more IS barriers 218a-218m. Still alternatively, in these embodiments, the power converter 212 may be implemented as a pass-through component that provides the received non-IS DC power to the one or more IS barriers 218a-218m without modifying the DC voltage of the received non-IS DC power.

Figure 2C:
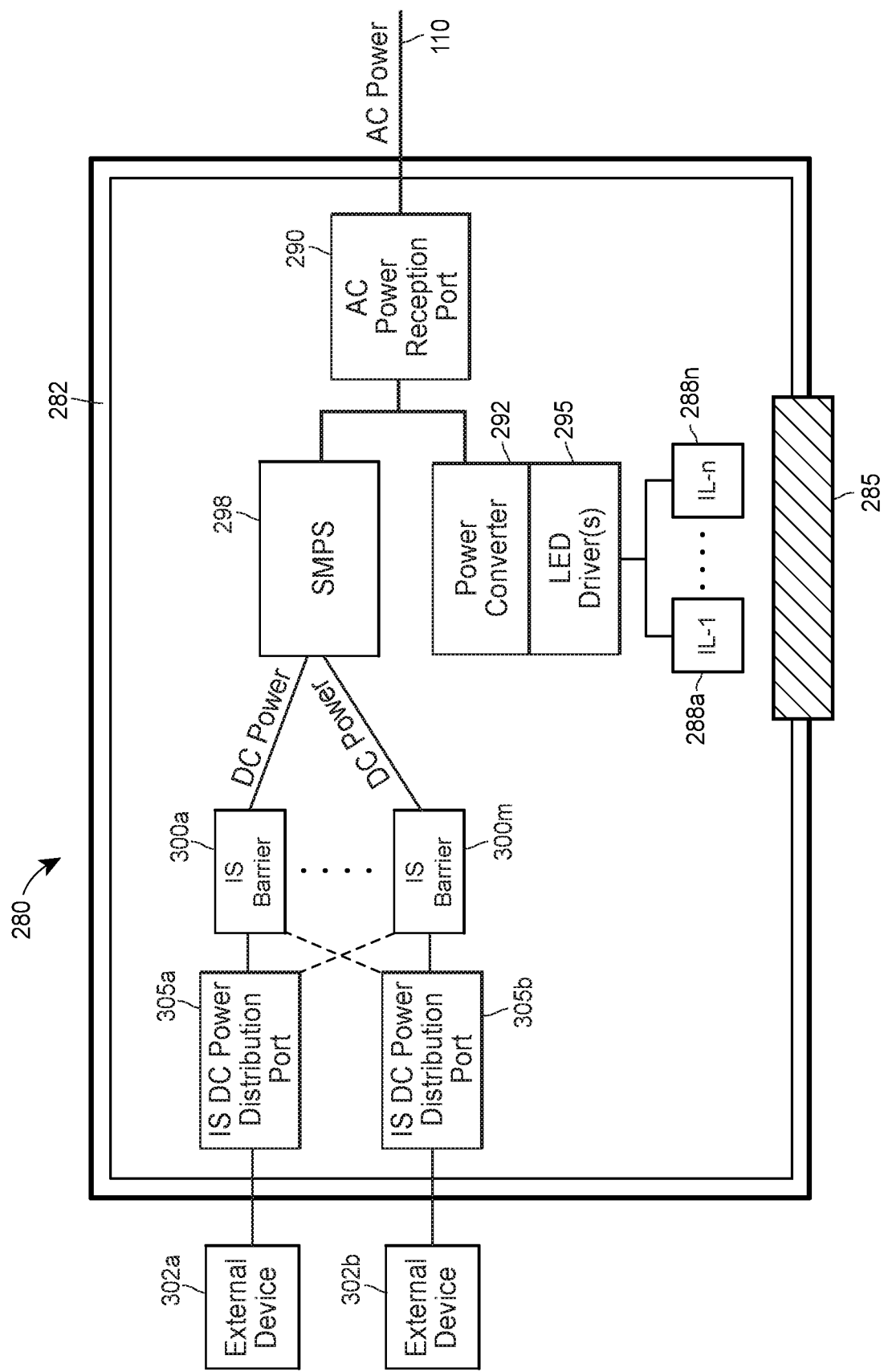
FIG. 2C is a block diagram of yet another embodiment of the intrinsically safe power source luminaire of FIG. 1.

FIG. 2C depicts another example embodiment 280 of an IS-PSL 100. Similar to the embodiments 200 and 250, the IS-PSL 280 includes a hazardous environment enclosure or housing 282 having an at least partly transparent or visible light-permeable portion 285 via which one or more illumination sources 288a-288n may radiate visible light into the hazardous environment. The IS-PSL 280 also includes a power-reception port 290 via which AC power 110 is received, and an AC-to-DC power converter 292 that supplies one or more LED drivers 295 with DC power so the LED driver(s) 295 may activate/deactivate or otherwise operate the illumination sources 288a-288n. The AC-to-DC power converter 292 and the LED driver(s) 295 may be an integral or unitary component of the IS-PSL 280, or the AC-to-DC power converter 292 and the LED driver(s) 295 may be separate components of the IS-PSL 280. In the embodiment 280 illustrated in FIG. 2C, the AC power received via the power-reception port 290 is also provided to an AC-to-DC switch mode power supply (SMPS) 298, which may convert or transform the received AC power 110 into a range of different DC voltages in a switched manner. That is, the DC power generated by the SMPS 298 may be switched between multiple different DC voltages across a range of DC voltages, e.g., 3 VDC to 300 VDC. As such, in this embodiment 280, the SMPS 298 may deliver each different DC voltage to a respective IS barrier 300 that is correspondingly rated. As such, the SMPS 298 may be connected to multiple IS barriers 300a-300m, each of which may be rated for a different DC voltage; however, generally only one of the IS barriers 300a-300m is utilized at any instance in time, e.g., the IS barrier 300 that corresponds to the DC voltage that is presently being generated by the SMPS 298 may be selected to receive DC power generated by the SMPS 298. The utilized IS barrier 300a-300m may then provide IS DC power to respective external devices 302a, 302b via respective IS DC power distribution ports 305a, 305b of the IS-PSL 280. Accordingly, this embodiment 280 may be particularly useful when the IS-PSL 280 intermittently powers multiple external devices of different native DC voltages, or when a provider desires to have multiple instances of a same model of the IS-PSL 280 respectively provide IS DC power to multiple external devices of different native DC voltages. To this end, in some embodiments, the SMPS 298 may be programmable, e.g., to indicate which levels of voltage are to be utilized and optionally under which conditions or timing.

It is noted that in embodiments of the IS-PSL 280 in which the IS-PSL 200 receives non-IS DC power via its power-reception port 290 (not shown), the AC-to-DC power converter 292 and the AC-to-DC switch mode power supply 298 may be omitted, and the received non-IS DC power may be provided from the power-reception port 290 to a DC-to-DC switch mode power supply, converter, splitter, and/or divider (which may be implemented as an integral component, or which may be implemented as multiple components). The DC-to-DC switch mode power supply, converter, splitter, divider, etc. may convert the received non-IS DC power into a range of DC voltages that are natively utilized by the recipient external devices 302a, 302b, e.g., in a switched manner and/or in a split or subdivided manner. As such, the non-IS DC power generated by the DC-to-DC switch mode power supply, converter, splitter, divider, etc. may deliver each different DC voltage to a respective IS barrier 300 that is correspondingly rated.

Figure 3:
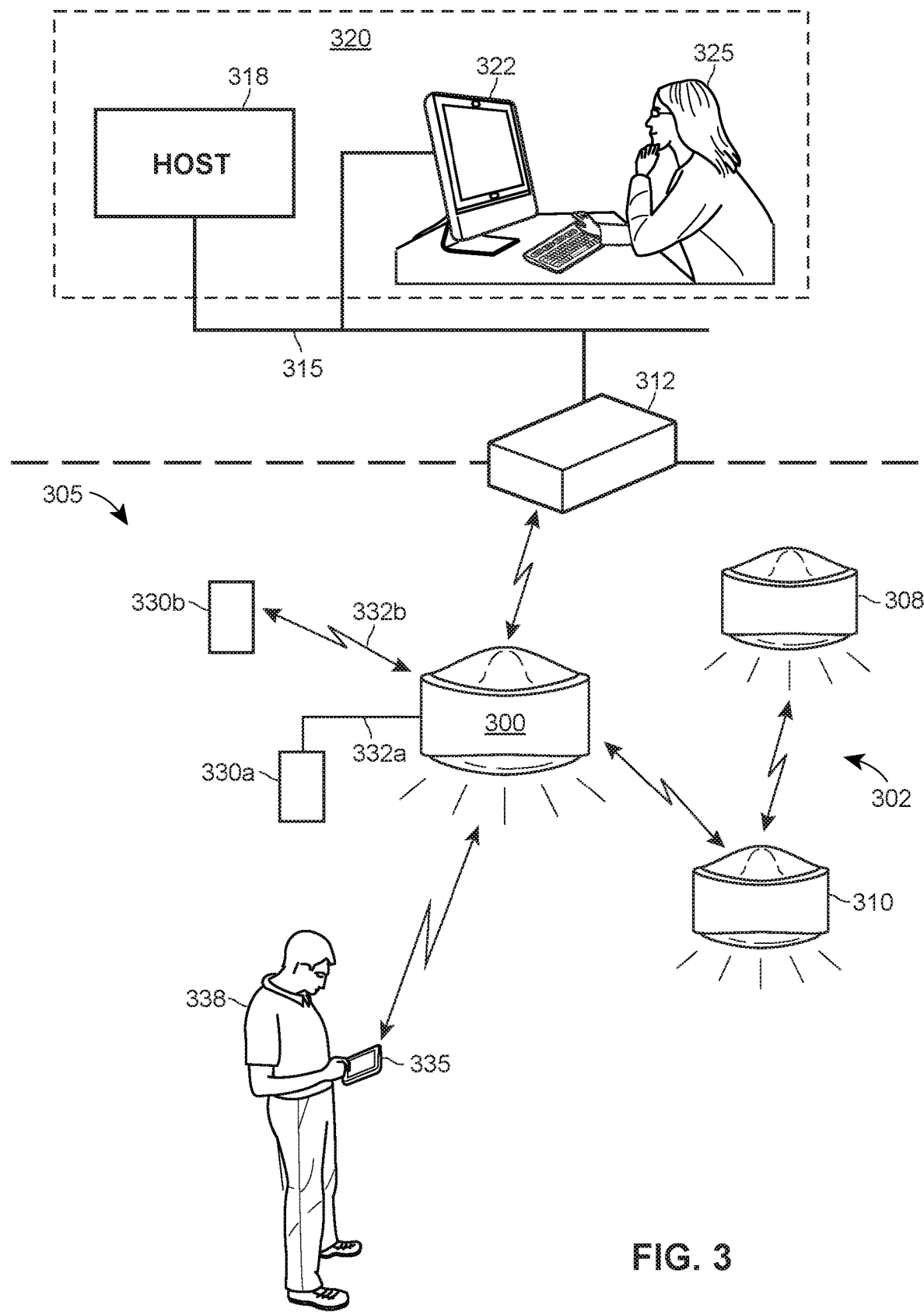
FIG. 3 depicts an example intrinsically safe power source luminaire in connection with other example components that are disposed in hazardous and non-hazardous environments.

FIG. 3 depicts an example intrinsically safe power source luminaire (IS-PSL) 300 located in an example hazardous environment 305. For example, the IS-PSL 300 of FIG. 3 may be an embodiment of the IS-PSL 100 of FIG. 1 or of the IS-PSL 200 of FIG. 2A. For ease of discussion herein (and not for limitation purposes), FIG. 3 is discussed below in conjunction with reference numbers included in FIGS. 1 and 2.

As illustrated in FIG. 3, the IS-PSL 300 is a node of a wireless network 302 of the hazardous environment 305, where the wireless network 302 includes other nodes such as other luminaires 308, 310 (which may be IS power source luminaires, or may be IS luminaires that do not provide IS DC power to other devices) and a wireless gateway 312 which communicatively interconnects the wireless network 302 and a wired network 315 associated with the hazardous environment 305. The wired network 315 may utilize Ethernet, broadband, fiber optic, or any suitable type of wired communications and/or data transmission protocols and media to communicatively connect a back-end server, host, controller, computing device, and/or group of computing devices behaving as a single logical server or host 318 with respect to the components (e.g., with respect to the luminaires 300, 308, 310, the wireless gateway 312, and/or other components) disposed in the hazardous environment 305. In the embodiment illustrated in FIG. 3, at least portions of the wired network 315 are disposed in a non-hazardous environment 320, which may be an environment 320 in which components are shielded or protected from the harsh conditions of the hazardous environment 305. Some components of the non-hazardous environment 320 may be disposed locally to the hazardous environment 305 (e.g., within an enclosure), and some may be disposed remotely from the hazardous environment.

The host 318 may be implemented by an individual computing device, by one or more controllers and/or systems associated with the hazardous environment (such as a programmable logic controller (PLC), distributed control system (DCS), or other type of industrial process control system), by a bank of servers, by a computing cloud, or by any suitable arrangement of one or more computing devices. The host 318 may service nodes of the wired network 315 and/or nodes of the wireless network 302. For example, the host 318 may provide (e.g., via download or other mechanism), to the IS-PSL 300, configuration and/or operating instructions 230 and/or data 232 that correspond to governing or controlling IS DC power delivery related to the IS-PSL 300. For example, the host 318 may provide one or more IS DC power thresholds and/or DC power thresholds of the external devices 330a, 330b serviced by the IS-PSL 300, and/or the host 318 may provide one or more IS DC power thresholds and/or DC power thresholds to which the IS-PSL 300 itself is subject.

Generally, the IS-PSL 300 communicates via the wireless network 302 using one or more on-board wireless communication interfaces, such as one or more of the communication interfaces 235a-235p. In some embodiments (not shown in FIG. 3), the IS-PSL 300 may directly communicate via the wired network 315 using one or more wired communication interfaces, such as one or more of the communication interfaces 235a-235p.

Wired network 315 may include a user computing device 322, which may be disposed in the non-hazardous environment 320. In some arrangements (not shown in FIG. 3), the user computing device 322 may be communicatively connected to the wired network 315 via a wireless link and access point (and optionally via one or more other networks), where the access point is communicatively connected in a wired manner to the network 315. A user 325 may utilize the computing device 322 to configure, modify, and/or otherwise provide instructions and/or data that is related to the IS-PSL 300 and utilized by and/or stored at the host 318, and/or to view data and information provided by other devices and/or nodes via the wired network 315 and/or the wireless network 302 corresponding to the hazardous environment 305. For example, via the user computing device 322, the user 325 may generate, delete, update, and/or modify the instructions 230 and/or the data 232 that is downloaded or otherwise provided by the host 318 to the IS-PSL 300.

The wired network 315 and the wireless network 302 may be in compliance with applicable hazardous environment standards and regulations. For example, the wireless network 302 may utilize Wi-Fi, WirelessHART, and/or one or more other communication protocols that are suitable for (e.g., is in compliance with all regulations and standards that are applicable to) the hazardous environment 305, and devices of the networks 302, 315 that are located at least partially within the hazardous environment 305 (e.g., the luminaires 300, 308, 310, the wireless gateway 312, and at least some components of the wired network 315) may similarly comply with all applicable hazardous environment standards and regulations that pertain to the hazardous environment 305.

As illustrated in FIG. 3, IS-PSL 300 provides IS DC power to a first external device 330a via a direct, IS wired connection 332a, and the IS-PSL 300 provides IS DC power to a second external device 330b via a direct, IS wireless connection 332b, e.g., in a manner similar to those described elsewhere herein. The wireless external device 330b may be a smart wireless device, and as such may communicate data and/or information pertaining to IS DC power with the IS-PSL 300 via the IS wireless connection 332b or a different wireless connection (not shown), for example. In some implementations, the smart wireless external device 330b may also communicate data and/or information pertaining to lighting control and status with the IS-PSL 300, e.g., when the IS-PSL 300 includes data 232 and computer-executable instructions 230 configured to perform lighting control and administration. Additionally or alternatively, a smart wireless external device 330b may communicate data and/or information pertaining to lighting control and status with other components 308, 310, 312, 318, 322 to which the smart wireless external device 330b is communicatively connected via the wireless network 302. The smart wireless external device 330b may utilize a wireless link (not shown) other than the IS wireless link 332b that it utilizes to communicate with the IS-PSL 300 to communicate via the wireless network 302. For example, the IS wireless link 332b may be a near field wireless power link, and the wireless link communicatively connecting the smart wireless external device 330b to the wireless network 302 (not shown) may be a WirelessHART link.

As further depicted in FIG. 3, the example hazardous environment 305 includes a portable computing device 335 that is operated by a user 338 within the hazardous environment 305. The portable computing device 335 is compliant with hazardous environment standards and regulations applicable to the hazardous environment 305. For example, the portable computing device 335 may be configured to communicate with the IS-PSL 300 and/or with other nodes of the wireless network 302 using a WirelessHART protocol or some other protocol that is suitable for (e.g., is in compliance with all regulations and standards that are applicable to) the hazardous environment 305. The portable computing device 335 may be any type of wireless or mobile computing device, such as a laptop, tablet, smart phone, smart device, wearable computing device (e.g., virtual reality device, headset, or other body-borne device), etc. The portable computing device 335 may or may not be a node of the wireless network 302.

In some embodiments, the portable computing device 335 is a wireless server, host, controller, computing device, and/or group of computing devices behaving as a single logical server or host that services the nodes of the wireless network 302. For example, the wireless host 335 may provide (e.g., via download or other mechanism), to the IS-PSL 300, configuration and/or operating instructions 230 and/or data 232 that correspond to governing or controlling IS DC power delivery related to the IS-PSL 300. For example, the wireless host 335 may provide one or more IS DC power thresholds and/or DC power thresholds of the external devices serviced by the IS-PSL 300, and/or the wireless host 335 may provide one or more IS DC power thresholds and/or DC power thresholds to which the IS-PSL 300 is subject to itself. The user 338 may utilize a user interface of the wireless host 335 to configure, modify, and/or otherwise provide instructions and/or data stored at the wireless host 335, and/or to view data and information provided by other devices and/or nodes via the wireless network 302 corresponding to the hazardous environment 305. For example, the user 338 may add, delete, and/or modify at least portions of the instructions 230 and/or the data 232 via a user interface of the host 335.

Generally speaking, a user 325, 338 may utilize one or more of the user interface computing devices 322, 335 to manage instructions 230 and/or data 232 corresponding to providing IS DC power via intrinsically safe power source luminaires, e.g., the IS-PSL 300 and/or other IS-PSLs utilized in the hazardous environment 305. The data 232 may include, for example, configurations of the IS-PSL 300 and configurations of the external devices 330a, 330b to which the IS-PSL 300 provides IS DC power, and the user 325, 338 may create, add, delete, and/or modify any configurations or portions thereof. For example, as discussed above, the user 325, 338 may add, delete, and/or modify IS DC power thresholds, alerts, status reporting, voltage levels, and/or other information corresponding to external devices serviced by the IS-PSLs and/or corresponding to the IS-PSL units themselves.

Figure 4:
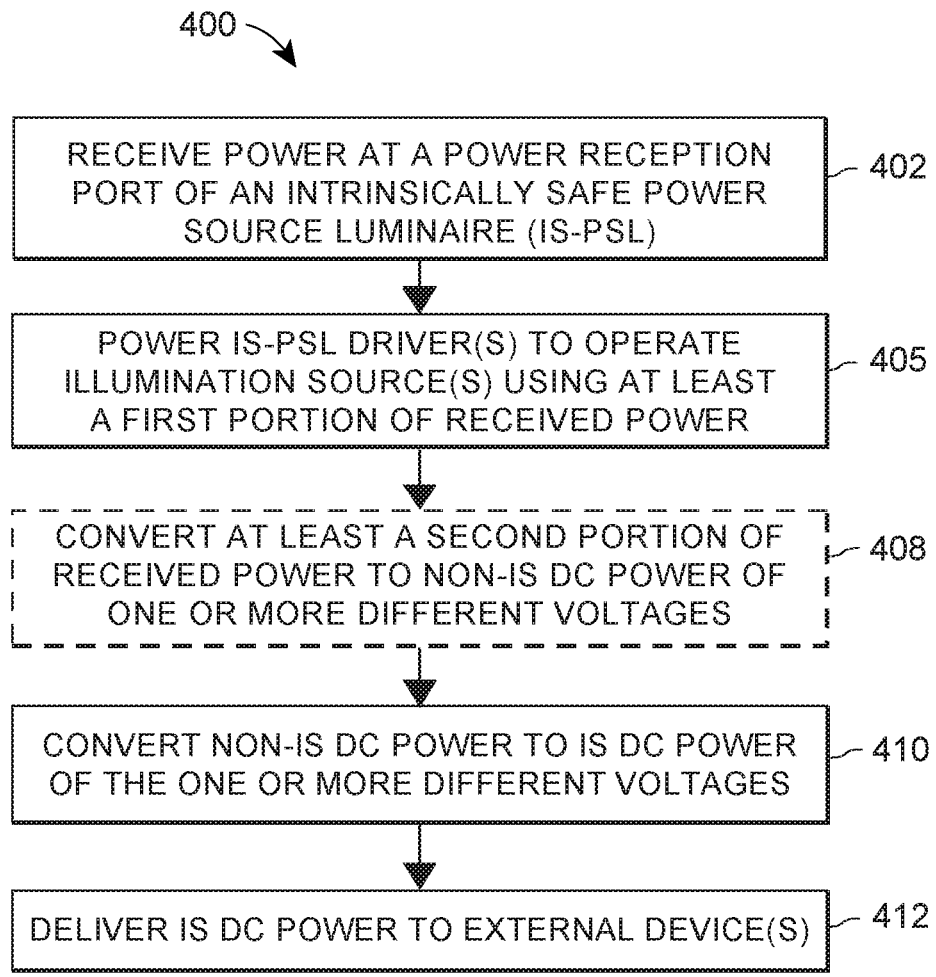
FIG. 4 illustrates a flow diagram of an example method at an intrinsically safe power source luminaire.

FIG. 4 depicts a flow diagram of an embodiment of a method 400 in an intrinsically safe power source luminaire, such as the IS-PSL 100, the IS-PSL 200, the IS-PSL 250, the IS-PSL 280, the IS-PSL 300, or other embodiments. For example, the method 400 may execute at an IS-PSL disposed in a hazardous environment, where the luminaire includes a hazardous location enclosure in which one or more drivers coupled to one or more illumination sources are disposed, the illumination sources may radiate visible light into the hazardous environment. The luminaire may optionally include a power converter, which may be implemented as an AC-to-DC power converter, a DC-to-DC power converter, a pass-through component, etc., e.g., in a manner such as described above. The luminaire may additionally include one or more intrinsically safe barriers that are disposed within the hazardous location enclosure, as well as a power-reception port and one or more power distribution ports. Generally speaking, the method 400 may operate in accordance with any IS-PSL having one or more of the features discussed herein. For ease of discussion, though, and not for limitation purposes, the method 400 is discussed below with respect to FIGS. 1, 2A, 2B, 2C, and 3. Further, in some embodiments, the method 400 includes one or more alternate or additional actions other than those described with respect to FIG. 4.

At a block 402, the method 400 includes receiving power via a power-reception port of an intrinsically safe power source luminaire (IS-PSL). Block 402 may include receiving the power in an intrinsically safe manner from a power source, such as an AC power panel, a low voltage non-IS DC voltage source, a high voltage non-IS DC voltage source, etc. For example, the power may be transmitted from the power source to the power-reception port via physical, intrinsically safe, power delivery transmission media, e.g., wires, cables, and the like that may be run thorough conduit or similar, and/or that are enclosed within a wall, ceiling, conduit, trench, etc. The power that is received by the IS-PSL via its power-reception port may be of any standard or suitable AC or DC voltage, such as 110 V AC, 115V AC, 220 V AC, 230 V AC, 240V AC, 440V AC, 2V DC, 5.6 V DC, 12V DC, 24 V DC, 30 V DC, 300 V DC, etc.

At a block 405, the method 400 includes powering the one or more drivers to operate (e.g., activate and/or deactivate) the one or more illumination sources using at least a first portion of the received power. For example, in embodiments in which the received power is AC power and the driver(s) are AC powered, the driver(s) may receive at least a first portion of the received AC power directly from the power-reception port. In embodiments in which the received power is AC power and the driver(s) are DC powered, the IS-PSL may include a power converter that converts at least a first portion of the AC power received via the power-reception port into the DC power that powers the one or more drivers. The power converter may be a separate and distinct component from the one or more drivers, or the power converter and at least one driver may be an integral component or unit. In embodiments in which the received power is standard, non-IS DC power and the driver(s) are DC powered, the one or more driver(s) may receive at least a first portion of the non-IS DC power directly from the power-reception port, via a DC-to-DC switch mode power supply, converter, voltage splitter, a voltage divider, etc., or via a pass-through component, etc.

Indeed, at an optional block 408, the method 400 includes converting or transforming, via the power converter, switch mode power supply, splitter, and/or divider, at least a second portion of the received AC or DC power into DC power of one or more DC voltages that is to be delivered to one or more external devices that are disposed in the hazardous environment in which the IS-PSL is disposed. The external devices may include, for example, a process controller, a solenoid driver, a safety controller or logic solver, another type of process control driver, a field device, a sensor, an I/O device, a device that includes a battery, etc. At least some of the DC power produced by the power converter/switch mode power supply/splitter/divider may be of a DC voltage that is natively utilized by a recipient external device. In embodiments in which the received power is non-IS DC power of a DC voltage that is native to the recipient external device, the block 408 may be omitted, or the power converter may merely pass through the received non-IS DC power received via the power-reception port.

Generally speaking, but not exclusively, the external devices that are recipients of IS DC power generated by the luminaire are intrinsically safe external devices. In an embodiment, e.g., in arrangements in which the IS-PSL services multiple different external devices of different native voltages, the power converter/switch mode power supply/splitter/divider, etc. of the luminaire may produce different non-IS DC voltages for delivery to the different external devices of different native voltages, e.g., sequentially, periodically, at pre-defined intervals, upon demand, when triggered, etc. In an embodiment, the power converter/switch mode power supply/splitter/divider is included in a single component that is configured to produce different non-IS DC voltages. In an embodiment, the luminaire may include multiple power converters, splitters, and/or dividers, at least some of which may produce, from the received AC or DC power, different non-IS DC voltages for different recipient external devices.

At a block 410, the method 400 includes converting, via an intrinsically-safe (IS) barrier disposed within the hazardous location enclosure of the luminaire, the non-IS DC power (which may have been produced by the power converter, switch mode power supply, splitter, divider, etc., or which may be the received non-IS DC power) into intrinsically-safe (IS) DC power. The IS barrier may have an IS rating (e.g., voltage, zone usage, class, division, group, etc.) that corresponds to a recipient external device. In some embodiments, the IS barrier is a configurable or modifiable IS barrier which may be re-configured (e.g., either manually or automatically) to be compliant with multiple different IS ratings. In some embodiments, the luminaire includes multiple IS barriers, at least some of which may have different IS ratings. The connectivity relationships between the power converter(s)/splitter(s)/divider(s) and the IS barrier(s) of the luminaire may be one-to-one, one-to-many, or many-to-many, if desired.

At a block 412, the method 400 includes delivering, via one or more power distribution ports of the luminaire, the IS DC power produced by the IS barrier(s) to one or more recipient external devices disposed in the hazardous environment. Each power distribution port may correspond to a different IS DC voltage that is native to a respective external device, for example. Each power distribution port may deliver IS DC power via a respective power delivery mechanism, e.g., in a wired manner via an intrinsically safe, physical power delivery transmission media, or in a wireless manner via near field wireless power delivery techniques, power beaming, etc.). Each power distribution port may deliver IS DC power produced by one or more of the IS barriers included in the luminaire. The connectivity relationships between the IS barrier(s) and the power distribution port(s) of the luminaire may be one-to-one, one-to-many, or many-to-many, as desired. The IS DC power that is delivered to the one or more recipient external devices may be respectively utilized by the one or more recipient external devices as a primary source of power, an auxiliary source of power, a back-up or emergency source of power, and/or to charge batteries utilized by the recipient external devices (where the batteries themselves may be a primary, auxiliary, back-up, and/or emergency source of DC power).

In some implementations, the luminaire includes one or more wired and/or wireless communication interfaces, one or more processors, and one or more memories (e.g., one or more tangible, non-transitory memories) storing data and computer-executable instructions which, when executed, allow the luminaire to communicate DC power-related information to/from other devices and systems. That is, the one or more processors may execute the computer-executable instructions to cause the luminaire to transmit and/or receive signals indicative of and/or otherwise pertaining to IS DC power with respect to the luminaire and/or to the external device(s) to which the luminaire provides IS DC power. In some embodiments, the execution of the computer-executable instructions may cause the luminaire to transmit and/or receive signals indicative of and/or otherwise pertaining to lighting status and/or control, e.g., of the luminaire itself and/or of other luminaires 308, 310. The one or more processors and the one or more memories may be disposed within the hazardous environment enclosure, for example. As discussed above, devices and/or systems with which the luminaire may communicate may include, for example, user operated devices 322, 335, back-end servers and/or hosts 318, other luminaires 308, 310, and/or external devices 330a, 330b to which the luminaire provides IS DC power.

In some embodiments, the one or more processors may execute the computer-executable instructions to cause the luminaire to monitor IS DC power related to the external device(s) to which the luminaire provides IS-DC power, and to generate and transmit signals corresponding to IS DC power usage of external devices to the back-end servers or hosts, user operated devices, and/or external devices. The luminaire may directly and/or indirectly monitor IS DC power that is provided to and/or consumed by the external device(s) (e.g., utilized by the external device(s) as a primary power source, as an auxiliary, back-up, and/or emergency source, for charging batteries, etc.). For example, the luminaire may monitor IS DC power that is delivered via one or more particular power delivery ports to a particular external device, e.g., for amounts of power, time intervals between power delivery, requests of the particular external device for additional power and the timing thereof, etc. for each particular power delivery port associated with the particular external device. The information indicative and/or related to IS DC power usage of the external device(s) that is transmitted by the luminaire may be related to the monitoring, and as such may include, for example, configurations, thresholds, statuses, usages, alerts, estimated lifetimes (e.g., of battery supply and/or the battery itself and/or other components), and the like. In some cases, the information transmitted by the luminaire may include instructions or commands issued by the luminaire to the particular external device to modify its consumption and/or usage of IS DC power, e.g., going to sleep, waking up, powering down, switching to using batteries as a primary power source, switching to provided IS DC power as a primary power source, etc. Additionally or alternatively, based on the monitoring of IS DC power related to the particular external device, the luminaire may modify and/or adjust its own behavior corresponding to delivery IS DC power. For example, the luminaire may select and/or switch to a different IS barrier and/or different power delivery port for delivery of IS DC power to the particular external device; the luminaire may modify the distribution of IS DC power among various power distribution ports; the luminaire may activate and/or deactivate various power distribution ports, etc.

Additionally or alternatively, the one or more processors may execute the computer-executable instructions to cause the luminaire to monitor IS DC power related to the luminaire itself, and generate and transmit signals corresponding to IS DC power usage of the luminaire to accordingly to the external devices, back-end servers or hosts, and/or user operated devices. For example, the luminaire may send alerts and/or status information related to its back-up battery 222 to user operated devices, the luminaire may instruct one or more external devices to modify behavior with respect to IS DC power differently based on conditions of the luminaire (e.g., conditions related to the usage of various on-board components 220, 218, 212, etc. of the luminaire).

Accordingly, embodiments of the novel and inventive intrinsically safe power source lighting unit, light fixture, or luminaire disclosed herein provide significant advantages over known techniques. For example, as IS-PSLs are installed to provide ambient and/or focused light in hazardous environment, the IS-PSLs may be easily leveraged to deliver IS DC power to electronic devices disposed within the hazardous environment, thereby greatly reducing (and in some situations, eliminating) the costs and resources that are typically needed to install, run, and maintain individual IS cabling runs to each electronic device requiring DC power. Further, utilizing IS-PSLs as IS DC power sources in a hazardous environment increases the flexibility and scalability of electronic devices and equipment within the hazardous environment, thereby increasing efficiencies as individual DC power cabling runs no longer affect the physical layout and placements of the electronic devices and equipment. Still further, various embodiments of the IS-PSL described herein may easily be applied to legacy HE luminaires and/or may be easily (re-)configured to service various external devices of different native DC voltages.

The following additional considerations apply to the foregoing discussion.

A portable computing device, such as the device 335, which may operate in conjunction with embodiments of the hazardous environment lighting unit, light lighting unit, light fixture, or luminaire disclosed herein can be any suitable device capable of wireless communications such as a smartphone, a tablet computer, a laptop computer, a wearable or body-borne device, a drone, a camera, a media-streaming dongle or another personal media device, a wireless hotspot, a femtocell, or a broadband router. Further, the portable computing device and/or embodiments of the disclosed hazardous environment lighting unit, light fixture, or luminaire can operate as an internet-of-things (IoT) device or an Industrial internet-of-things (IIoT) device.

Certain embodiments are described in this disclosure as including logic or a number of components or modules. Modules may can be software modules (e.g., code stored on non-transitory machine-readable medium) or hardware modules. A hardware module is a tangible, non-transitory unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for a hazardous environment lighting unit, light fixture, or luminaire that communicates alerts and/or detected conditions and/or events via visual sequences through the principles disclosed in this disclosure. Thus, while this document illustrates and describes particular embodiments and applications, the disclosed embodiments are not limited to the precise construction and components disclosed. Various modifications, changes and variations, which will be apparent to those of ordinary skill in the art, may be made in the disclosed arrangement, operation and details of the method, and apparatus without departing from the spirit and scope defined in the appended claims.

What is claimed is:

1. A luminaire disposed in a hazardous environment in which an industrial process is being controlled, the luminaire comprising:
   a power-reception port via which power is received;
   one or more drivers coupled to one or more illumination sources, the one or more drivers powered by at least a first portion of the power received via the power-reception port to operate the one or more illumination sources to provide illumination in the hazardous environment in which the industrial process is being controlled;
   one or more memories storing a respective intrinsically-safe (IS) power configuration for each of one or more external IS devices utilized to control the industrial process, each of the one or more external IS devices being a respective process controller, solenoid driver, safety controller, another type of process control driver, safety logic solver, I/O device, actuator, pump, or valve;
   one or more power converters that convert, based on the one or more IS power configurations, at least a second portion of the power received via the power-receiving port into DC power of different DC voltages utilized by the one or more external IS devices;
   one or more intrinsically-safe (IS) barriers that convert the DC power of the different DC voltages generated by the one or more power converters into IS DC power of the different DC voltages;
   one or more power distribution ports via which the IS DC power of the different DC voltages is delivered to power the one or more external IS devices disposed in the hazardous environment; and
   a hazardous location enclosure in which the one or more drivers, the one or more illumination sources, the one or more power converters, and the one or more IS barriers are disposed.

2. The luminaire of claim 1, wherein one of:
   the power received at the luminaire via the power-reception port is AC power having a voltage included in a range of voltages from 100 V AC to 480 V AC, and the one or more power converters include an AC-to-DC power converter; or
   the power received at the luminaire via the power-reception port is DC power having a voltage included in a range of voltages from 24 V DC to 300 V DC, and the one or more power converters include a DC-to-DC power converter or a pass-through component.

3. The luminaire of claim 1, wherein the different DC voltages of the IS DC power produced by the one or more IS barriers include at least two of: 5.5 V DC, 12 V DC, 24 V DC, 300 V DC, or another DC voltage that is utilized by the one or more external IS devices.

4. The luminaire of claim 1, wherein the IS DC power delivered to a particular external IS device included in the one or more external IS devices includes:
   a primary source of DC power or emergency or back-up power for the particular external IS device, the at least one of the primary source of DC power or the emergency or back-up power for the particular external IS device corresponding to a first DC voltage; and
   power to charge a battery of the particular external IS device, the power to charge the battery of the particular external IS device corresponding to a second DC voltage different than the first DC voltage.

5. The luminaire of claim 1, wherein the luminaire includes a plurality of power distribution ports that correspond to at least one of different power transmission media or the different DC voltages.

6. The luminaire of claim 1, wherein the one or more IS barriers include a plurality of IS barriers of different types that vary in at least one of: hazardous location classification, hazardous location zone, hazardous material division, hazardous material group, temperature rating, flameproof rating, dust ignition rating, non-incendive rating, or protection level.

7. The luminaire of claim 6, wherein the luminaire includes at least two IS barriers of a same IS barrier type.

8. The luminaire of claim 6, wherein the luminaire includes at least two IS barriers having different IS barrier types.

9. The luminaire of claim 1, further comprising an on-board battery that is at least one of a back-up, supplemental, and/or emergency power source for the luminaire, and wherein the on-board battery is a recipient of at least some of the IS DC power produced by the one or more power converters.

10. The luminaire of claim 1,
further comprising one or more communication interfaces and one or more processors configured to cause one or more signals that are indicative of at least one of a status or an alert condition related to the IS DC power to be transmitted from the luminaire via the one or more communication interfaces to at least one of: a portable communication device disposed within the hazardous environment, or a back-end server or computing device; and
wherein the status or the alert condition related to the IS DC power corresponds to at least one of:
  IS DC power utilized by the luminaire,
  IS DC power corresponding to the one or more external IS devices and monitored by the one or more processors of the luminaire, or
  respective batteries of the one or more external IS devices.

11. The luminaire of claim 10, wherein the one or more signals that are to be transmitted from the luminaire via the one or more communication interfaces include a command to modify a power usage of a particular external IS device of the one or more external IS devices.

12. The luminaire of claim 10, wherein the one or more IS barriers include a plurality of IS barriers, and the one or more processors are further configured to at least one of: disable and enable at least one of the IS barriers of the plurality of IS barriers, switch between different IS barriers of the plurality of IS barriers, select a particular IS barrier of the plurality of IS barriers, or control respective usages of the plurality of IS barriers.

13. The luminaire of claim 10, wherein:
the one or more power distribution ports include a plurality of power distribution ports that correspond to at least one of different power transmission media or the different DC voltages; and
the one or more processors are further configured to control a distribution of the IS DC power among the plurality of power distribution ports.

14. The luminaire of claim 1, wherein the one or more drivers are directly coupled to the power-reception port, and the one or more power converters are directly coupled to the power-reception port.

15. The luminaire of claim 1, wherein the one or more power converters are included in the one or more drivers or in a switch mode power supply.

16. The luminaire of claim 1, wherein the one or more power converters are programmable to modify at least one of the different DC voltages of the DC power produced by the one or more power converters.

17. A method at a luminaire disposed in a hazardous environment in which an industrial process is being controlled, the luminaire including a hazardous location enclosure in which one or more drivers coupled to one or more illumination sources are disposed, and the method comprising:
receiving power via a power-reception port of the luminaire;
powering the one or more drivers to operate the one or more illumination sources using at least a first portion of the received power to provide illumination in the hazardous environment in which the industrial process is being controlled;
converting, via one or more power converters disposed within the hazardous location enclosure of the luminaire and based on one or more IS configurations stored in the one or more memories of the luminaire, at least a second portion of the received power into DC power of different DC voltages utilized by one or more external IS devices that are disposed in the hazardous environment and that are utilized to control the industrial process, each of the one or more external IS devices being a respective process controller, solenoid driver, safety controller, another type of process control driver, safety logic solver, I/O device, actuator, pump, or valve;
converting, via one or more intrinsically-safe (IS) barriers disposed within the hazardous location enclosure of the luminaire, the DC power produced by the one or more power converters into intrinsically-safe (IS) DC power; and
delivering, via one or more power distribution ports of the luminaire, the IS DC power to the one or more external IS devices.

18. The method of claim 17, wherein receiving the power via the power-reception port includes receiving AC power having a voltage in a range of 100 V AC to 480 V AC, and wherein the one or more power converters include an AC-to-DC power converter.

19. The method of claim 17, wherein receiving the power via the power-reception port includes receiving DC power having a voltage in a range of 24 V DC to 300 V DC, and the one or more power converters include a DC-to-DC power converter or a pass-through component.

20. The method of claim 17, further comprising causing, by one or more processors disposed within the hazardous location enclosure of the luminaire, one or more signals indicative of the IS DC power to be transmitted from the luminaire via one or more communication interfaces of the luminaire to at least one of a portable communication device disposed within the hazardous environment, a back-end server or computing device, or at least one of the one or more external IS devices.

21. The method of claim 20,
further comprising monitoring, by the one or more processors, the IS DC power; and
wherein the causing of the one or more signals indicative of the IS DC power to be transmitted from the luminaire is based on the monitoring.

22. The method of claim 21, wherein the one or more signals indicative of the IS DC power includes one or more signals indicative of at least one of:
a status related to IS DC power corresponding to the one or more external IS devices;
an alert condition related to the IS DC power corresponding to the one or more external IS devices;
a command to modify a power usage of a particular external IS device of the one or more external IS devices;
a battery of the one or more external IS devices; or
a battery of the luminaire.

23. The method of claim 22, further comprising:
obtaining, by the one or more processors via the one or more communication interfaces, a configuration of the luminaire, the configuration including one or more thresholds corresponding to delivering the IS DC power to the one or more external IS devices; and wherein the alert condition is triggered based on at least one of the one or more thresholds.

24. The method of claim 20, further comprising causing, by one or more processors, one or more signals indicative of at least one of a lighting status or a lighting control command to be transmitted from the luminaire via the one or more communication interfaces to at least one of: one or more other luminaires, the portable communication device, or the back-end server or computing device.

25. The method of claim 20, further comprising at least one of enabling or disabling, by the one or more processors, at least one of the one or more IS barriers.

26. The method of claim 25, wherein the one or more IS barriers include a plurality of IS barriers, and the method further comprises at least one of:
- controlling, by the one or more processors, respective usages of the plurality of IS barriers disposed within the hazardous enclosure of the luminaire;
- controlling, by the one or more processors, a distribution of the IS DC power among a plurality of power distribution ports included in the luminaire, the plurality of power distribution ports respectively corresponding to at least one of: different IS barriers included in the plurality of IS barriers, different power transmission media, or the different DC voltages;
- selecting, by the one or more processors, a particular IS barrier of the plurality of IS barriers for converting at least some of the DC power produced by the one or more power converters into corresponding IS DC power; or
- switching, by the one or more processors, between multiple IS barriers of the plurality of IS barriers for converting the DC power produced by the one or more power converters into the IS DC power.

27. The method of claim 26, wherein
- two different IS barriers of the plurality of IS barriers produce different levels of DC voltage; or
- each of more than one different IS barrier of the plurality of IS barriers provides a same level of DC voltage.

28. The method of claim 17, wherein delivering the IS DC power to the one or more external IS devices comprises at least one of:
- delivering at least one of emergency or back-up power to a first at least one of the one or more external IS devices;
- delivering the IS DC power to at least the first or a second at least one of the one or more external IS devices as a primary source of IS DC power; or
- delivering the IS DC power to charge respective batteries of the first, the second, or a third at least one of the one or more external IS devices.

29. The method of claim 17, wherein delivering the IS DC power to the one or more external IS devices comprises delivering the IS DC power to a plurality of external IS devices, the plurality of external IS devices including a sensor utilized in controlling the industrial process.

30. The method of claim 17, wherein the luminaire includes a plurality of different power distribution ports, and delivering the IS DC power to the one or more external IS devices comprises delivering different levels of IS DC power to different external IS devices via the different power distribution ports.

31. The luminaire of claim 1, wherein the one or more external IS devices is a plurality of external IS devices, and the plurality of external IS devices includes at least one sensor utilized in the control of the industrial process.

* * * * *